United States Patent [19]

Stadelmann et al.

[11] 3,963,101
[45] June 15, 1976

[54] LENGTHWISE DISPLACEABLE, PRESSURE MEDIUM CHARGED, HYDRAULICALLY BLOCKABLE ADJUSTMENT ASSEMBLY

[75] Inventors: Ludwig Stadelmann; Fritz Bauer, both of Altdorf, Germany

[73] Assignee: Suspa Federungstechnik Fritz Bauer & Sohne oHG, Altdorf, Germany

[22] Filed: July 30, 1975

[21] Appl. No.: 600,524

[52] U.S. Cl. .......................... 188/300; 248/354 H; 267/65 R; 297/355
[51] Int. Cl.² ........................................ F16F 9/32
[58] Field of Search .................. 188/300; 297/355; 248/354 H; 267/65 R, 131

[56] References Cited
UNITED STATES PATENTS

| | | | |
|---|---|---|---|
| 3,143,332 | 8/1964 | Watlington | 248/354 H X |
| 3,625,540 | 12/1971 | Jewell | 267/65 R X |
| 3,837,704 | 9/1974 | Bauer | 297/355 X |
| 3,860,098 | 1/1975 | Porter | 188/300 |

Primary Examiner—George E. A. Halvosa
Attorney, Agent, or Firm—Browdy and Neimark

[57] ABSTRACT

An adjustment assembly has two coaxially mounted cylinders fitting into one another with a piston displaceably mounted within the inside cylinder and dividing the inside cylinder into two fluid filled housing chambers. The piston is connected to a piston rod which is guided out of one end of the cylinder in a sealed manner. A pressure medium chamber is provided in the annular space between the cylinders and is separated in a fluid tight manner from fluid filled parts of the annular space by two axially displaceable separating pistons. The lower housing chamber has a fluid passageway to the lower portion of the annular space and the upper housing chamber has a fluid passageway to the upper part of the annular space. The inner cylinder may be axially displaced from outside the assembly to seal or open the upper passageway thus locking or unlocking the piston.

13 Claims, 2 Drawing Figures

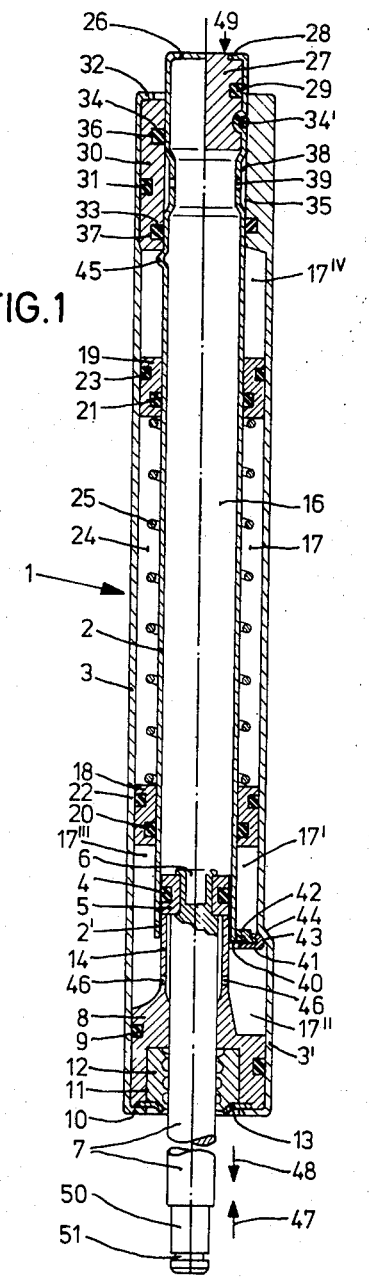
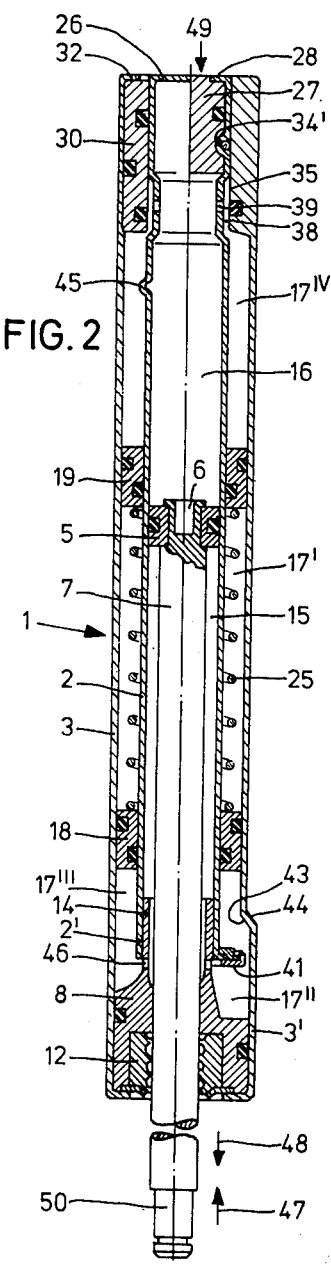

LENGTHWISE DISPLACEABLE, PRESSURE MEDIUM CHARGED, HYDRAULICALLY BLOCKABLE ADJUSTMENT ASSEMBLY

FIELD OF THE INVENTION

The present invention relates to an adjustment assembly and more particularly to an adjustment assembly which is lengthwise displaceable, pressure medium charged and hydraulically blockable.

BACKGROUND OF THE INVENTION

British Pat. No. 1,123,030 teaches such an adjustment assembly, in which the inside cylinder is guided in a fixed manner within the outside cylinder between a sealing sleeve, which guides the piston rod and seals off the cylinder at the same end, and a plug mounted at the opposite end of the cylinder, said plug being provided with a sealing element operable from outside by rotation, said element serving to close or open the passageway. At the end where the piston rod emerges, the cylinders are sealed off from one antoher in a liquid- or gas-tight manner. The pressure medium chamber extends from the sealing plug on the piston rod side to the separating piston. The piston mounted on the piston rod has at least one throttle bore through which the fluid can flow when the piston rod is displaced from one housing chamber to the other. With the sealing element closed, the adjustment assembly is completely blocked against compressive forces, while only limited blockage is provided against tensile forces.

U.S. Pat. No. 3,837,704 is a lengthwise adjustable gas- or liquid-filled lifting device, particularly for continuous height adjustment of chair seats, tables, or the like, with two cylinders fitting coaxially into each other, and with a piston displaceably mounted in the inside cylinder with a seal bearing against the inside wall of the inner cylinder which divides the inside cylinder into two housing chambers. The piston is connected with a piston rod which emerges from one end of the cylinder in a sealed manner. The housing chamber on the piston rod side is always connected by at least one opening with the annular chamber between the cylinders and with a valve which is coaxially operable from outside located at the opposite end. The valve serves to connect or separate the other housing chamber with or from the annular chamber via at least one passageway. In this case a valve pin is provided on the end opposite the piston rod end, the pin being located in the sealing plug of the outside cylinder and inside cylinder. The pin is capable of being pushed in the lifting direction to connect the housing chamber with the annular chamber. The inside of the sealing plug is provided with a bore with a slightly larger diameter than the cylindrical part of the release pin and an expansion of the bore to accept a seal. A bypass chamber is provided between this inside part of the sealing plug and the outside part, connected via a bore in the inside part with the cylindrical annular chamber and on the other side via a connecting chamber which is formed when the operating pin is pushed in between the annular groove and the inside wall of the seal. The connecting chamber is connectable with the housing chamber delimited by the sealing element. In this known, length-adjustable lifting device, therefore, a separate locking element is mounted at one end.

SUMMARY OF THE INVENTION

The purpose of the present invention is to simplify an adjusting device of the type described hereinabove in terms of its design and thereby make it more functionally reliable.

This goal is achieved, according to the present invention, by having the inner cylinder axially displaceable within the outer cylinder between a locking position in which a passageway between the upper part of the inside of the inner cylinder is sealed off from the upper part of the annular space between the two cylinders, and a releasing position in which the upper part of the inside of the inner cylinder has a fluid connection with the upper part of the annular space, and by having at least one part of the lower portion of the annular chamber between the two cylinders in constant fluid communication with the lower part of the inside of the inner cylinder. The inner cylinder is sealed at its end opposite the piston rod, which end is exposed to the outside. A pressure medium chamber is formed in the center part of the annular chamber and is delimited by two axially displaceable separating pistons which are gastight. The piston within the inner housing is fluid tight.

The method of the invention therefore consists of the inside cylinder serving simultaneously as a locking element and a releasing device without significant additional expenditure with respect to the construction of the inside cylinder. Practically the entire expense required for the locking element can be eliminated. Since the inside cylinder necessarily is provided with a larger diameter than the acutating pin of a locking element, a better seal to the outside is provided. In addition, without increasing the structural length and the outside diameter of the adjustment assembly, the fluid space is enlarged. The delimiting of the pressure medium chamber by two axially displaceable separating pistons constitutes a measure novel in itself, which allows the conversion of the gas spring, known for example from German offenlegungsschrift No. 1,812,282, into a fluid-blockable adjustable device.

The measures according to the invention make it possible for the inside cylinder to be guided in a simple sleeve at the end of the outside cylinder opposite the end at which the piston rod emerges. Advantageously, the passageway is located in the vicinity of an annular channel which is formed by a constriction of the wall of the inside cylinder, said annular channel bridging a seal in the sleeve when the inside cylinder is pushed into the gas spring. The passageway is also made advantageously, as is known, in the form of a flow throttle.

In order to prevent tilting of the inside cylinder and of the piston rod and hence the risk of leakage of the adjustment assembly, it is advantageous for the inside cylinder to be guided radially in a play-free manner at the piston rod end, wherein this guidance can be effected by having the inside cylinder radially guided on a tubular stop of a sealing sleeve which closes the outside cylinder in a gas- or liquid-tight manner and seals off the piston rod as it emerges from the outside cylinder.

Advantageously the sleeve is made in one piece with the outside cylinder; this can be effected in a particularly simple manner by manufacturing the outside cylinder together with the sleeve in a cold-rolling process.

It is of further advantage if the inside cylinder is provided with a stop which prevents it from sliding out of the outside cylinder, said stop being capable of being made in a form which is only partially blockable against stresses, i.e., a stop ring resting against the inside end face of the sleeve, said stop ring capable of being simply formed, for example by rolling out the inside cylinder. In another novel further embodiment of the invention the inside cylinder, at the end from which the piston rod emerges, is provided with a seal which rests against a valve seat provided on the inside wall of the outside cylinder, and divides the fluid-filled partial chamber of the annular chamber into two partial chambers in a fluid-tight manner and prevents the inside cylinder from sliding out of the outer cylinder. By means of this novel further embodiment, the adjustment assembly is completely blockable not only with respect to compressive stresses but also with respect to tensile stresses within the limits of the mechanical strength of the adjustment assembly. This novel further embodiment is particularly significant for the adjustment of an automobile seat back, since this must be adjustably mounted in such a way that it is absolutely fixed in both directions even against strong stresses, for example those generated in accidents. It has been found advantageous to have the seal fit around a radial annular flange on the inside cylinder, with the seal advantageously made of hard rubber such as ebonite or vulcanite. Structural design and hence manufacturing cost are particularly simple if the valve seat is constituted by a conical transition element between an expansion of the outside cylinder at the end which is on the side from which the piston rod emerges and the rest of the outside cylinder.

Further advantages and features of the invention will be apparent from the descriptions of embodiments with reference to the drawings.

BRIEF DESCRIPTION OF THE DRAWINGS

FIG. 1 shows an axial lengthwise section through an adjustment assembly according to the invention, with an inside cylinder serving as a locking element, with the locking element in the closed position, wherein different embodiments are partially shown on either side of the axis of symmetry, and FIG. 2 shows the adjustment assembly in a form according to FIG. 1 with the locking element released.

DETAILED DESCRIPTION OF PREFERRED EMBODIMENTS

The adjustment assembly has a housing 1, consisting essentially of two steel tubes fitting concentrically into each other, said tubes having different diameters, namely an inside cylinder 2 and an outside cylinder 3. Inside cylinder 2 contains a piston 5 which is guided axially and displaceably, said piston being sealed off by an annular seal with its outside circumference bearing against the inside wall of cylinder 2 against which said piston rests, and further being fastened by a hollow pin 6 to a piston rod 7 which runs coaxially to the housing and projects therefrom. Here, piston rod 7 is guided in a radially practically play-free manner in a sealing sleeve 8, said sleeve being press-fitted in outside cylinder 3 and being sealed off with respect thereto along its outside circumference by means of an annular seal 9. This sealing sleeve 8 is prevented from sliding out of outside cylinder 3 by a bead 10 on outside cylinder 3 which fits over its outwardly facing end face.

A cylindrical recess 11 in sealing sleeve 8 is provided with a lip seal 12 whose sealing lips rest against piston rod 8, so that said piston rod is also sealed off as it emerges from housing 1. Lip seal 12 is protected against axial displacement with respect to sealing sleeve 8 by a sealing disc 13 mounted between sealing sleeve 8 and bead 10.

Inside cylinder 2 is supported at its end 2', the same end from which the piston rod emerges, by a tubular stop 14 mounted coaxially with inside cylinder 2, said stop 14 being mounted radially almost play-free, but axially displaceable on sealing sleeve 8.

Piston 5 divides the interior of inside cylinder 2 into two housing chambers, namely into a housing chamber 15 which faces the end of housing 1 from which the piston rod emerges and a housing chamber 16 located on the other side of piston 5.

The cylindrical annular chamber 17, located between inside cylinder 2 and outside cylinder 3, contains two separating pistons 18 and 19 which are axially displaceable in annular chamber 17, said separating pistons being sealed by means of annular seals 20 and 21 with respect to the outside wall of inside cylinder 2 and by means of annular seals 22 and 23 with respect to the inside wall of outer cylinder 3. Pressure chamber 24, located between the two separating pistons 18, 19 and forming part of cylindrical chamber 17, is filled with an elastic flexible pressure medium, namely a pressure gas and/or a pretensioned coil spring 25 which rests against the two annular surfaces of separating pistons 18 and 19 which face each other.

Inside cylinder 2 is sealed off in a gas-tight manner at its end face at the end of housing 1 which is opposite the end from which the piston rod emerges. This can be accomplished either by means of a plate 26 mounted on the end-face end (see left half of FIG. 1) or by means of a plug 27 which is press-fitted into the outer end of the inside cylinder, said plug being held in place axially by means of a bead 28 at the outer end of the inside cylinder (See FIG. 1, right half). This plug 27 is sealed off in a gas-tight manner (by means of an annular seal 29 on its outside circumference) from the inside wall of the inside cylinder. Inside cylinder 2 is led out from this end of housing 1, and is guided by a cylindrical annular sleeve 30. Sleeve 30 either fits in the same manner as sealing sleeve 8 (by means of a press fit) in outside cylinder 3, and is sealed off in a gas-tight manner with respect to the latter by means of an annular seal 31, being prevented from sliding out of housing 1 by means of bead 32 which fits over its outwardly located end-face (see left half of FIG. 31), or sleeve 30 is made in one piece with outside cylinder 3 (see FIG. 1, right side); the latter is particularly advantageous when the outside cylinder is manufactured by the cold extrusion method.

Inside cylinder 2 projects from housing 1 in the resting position shown in FIG. 1. Annular seals 36, 37 are spaced in corresponding annular grooves 33, 34 in bore 35 on sleeve 30, said annular seals each sealing inside cylinder 2 gas-tight relative to sleeve 30. Annular seal 36, facing the outside of housing 1, can also be mounted in a corresponding annular groove 34', made for example by crimping (see FIG. 1, right side) in the outside wall of inside cylinder 2.

A construction which serves as an annular channel 38 is provided on the outside of inside cylinder 2, said constriction being located between the two annular seals 36 and 37 when inside cylinder 2 is in the resting position shown in FIG. 1. The distance between these two annular seals 36 and 37 is therefore always greater than the axial length of this annular channel 38. In the wall of inside cylinder 2, in the vicinity of annular channel 38, at least one passageway 39, in the form of a throttle bore, is provided, said passageway connecting annular channel 38 with housing chamber 16.

On its end 2', which faces the end from which the piston rod emerges, inside cylinder 2 has an annular flange 40 projecting approximately radially outward, formed for example by beading, with an annularly shaped seal 41 being applied to said annular flange. This seal fits around flange 40, advantageously on its outside surface and against its two end faces; a stiffening ring 42 may be added if desired. This seal 41, shown at the right in FIG. 1, in the resting position of inside cylinder 2, as shown in FIG. 1, fits in a sealing manner against a valve seat 43 provided in the inside wall of the outside cylinder, so that part 17' of annular chamber 17, delimited by separating piston 18 and seal 41, is separated in a completely liquid-tight manner from part 17'' of annular chamber 17 which is located on the other side of seal 41, said partial chamber 17'' therefore constituting the end of annular chamber 17 on the side from which the piston rod emerges. Valve seat 43, as seen from the end of housing 1 which is on the side wherefrom the piston rod emerges is mounted behind seal 41 and has a smaller inside diameter than the outside diameter of seal 41, so that it serves simultaneously to hinder axial displacements of inside cylinder 2 out of housing 1 beyond the resting position shown in FIG. 1. Valve seat 43 can be structured in a particularly simple fashion so that outside cylinder 3 in its area 3' located between valve seat 43 and the end on the side from which the piston rod emerges can be expanded, retaining the cylindrical shape of this segment as well, so that the inside of the conical transition section 44 between the expanded section 3' and the thinner part of outside cylinder 3 is formed. The outside diameter of seal 41 is somewhat smaller than the inside diameter of this expanded section 3'.

In a simplified embodiment, which is not blockable with respect to tensile forces on piston rod 7, annular flange 40 with seal 41 and valve seat 43 are eliminated, i.e., outside chamber 3 is not expanded at the end which is the same side as that wherefrom the piston rod emerges. Inside cylinder 2 is prevented from sliding out of housing 1 by means of a stop ring 45 located in annular chamber 17 and manufactured for example by rolling out, or by means of a very small stop ring 45 with a larger diameter than the coaxial cylindrical bore 35 which guides the inside cylinder in sleeve 30. In the resting position shown in FIG. 1, this stop ring 45 rests against the inside face of sleeve 30. The partial chamber 17''' of annular chamber 17 formed between the separating piston at the end of the housing which is on the side wherefrom the piston rod emerges and sealing sleeve 8 is therefore no longer divided into two other partial chambers 17' and 17''. The latter embodiment is shown at the left in FIG. 1.

Housing chamber 15, adjacent to the end of housing 1 wherefrom the piston rod emerges, is always connected by at least one bore 46 in stop 14 with partial chamber 17'' or partial chamber 17''' of cylindrical annular chamber 17, with tubular stop 14 having a larger diameter than piston rod 7 at least from this bore 46 to its free end. Housing chambers 15,16, partial chambers 17', 17'' and 17''' and partial chamber 17$^{IV}$ of annular chamber 17 located between the inside endface of sleeve 30 and the adjacent separating piston 19 are filled with a practically incompressible fluid, for example oil, while, as already mentioned, pressure medium chamber 24 is not filled with such a fluid.

The adjustment assembly operates as follows:

In the resting position of inside cylinder 2 shown in FIG. 1 for both embodiments, passageway 39 between the two annular seals 36 and 37 is located such that there is no connection between housing chamber 16 and partial chamber 17$^{IV}$, while a connection between housing chamber 15 from which the piston rod emerges and partial chambers 17'' and 17''' is always provided via bore 46. Piston 5 and hence piston rod 7 are therefore in a resting position as shown in FIG. 1 in which they are blocked firmly and inelastically against compressive stresses acting in the direction shown by arrow 47 since it is pressed against the fluid which is located in housing chamber 16 and cannot escape. The embodiment shown at the right of FIG. 1 is completely blocked against tensile stresses acting in the direction shown by arrow 48, since a tensile stress 48 due to the pressure exerted by the annular surface of piston 5 upon the liquid contained in housing chamber 15 and partial chamber 17'' increases the closing pressure of seal 41 against valve seat 43, i.e., in no case can fluid move from partial chamber 17'' into adjacent chamber 17'. It should be mentioned in this connection that in addition, due to the pretensioning of the fluid by the pressure medium in pressure medium chamber 24, seal 41 is pressed firmly against valve seat 43.

This embodiment, which is completely blockable bilaterally, is fully suited for rake adjustment and fastening of automobile seat backs where blockage in the two possible swiveling directions is of great importance.

In the embodiment at the left in FIG. 1, without seal 41 or valve seat 43, the adjustment assembly is blocked against tensile stresses until tensile force 48 becomes so great that the fluid column in housing 16 breaks down. This embodiment is therefore well suited for height adjustment of tables, since only relatively small tensile forces (if any) are normally involved.

If inside cylinder 2, through the exertion of a corresponding actuating force 49, is pressed sufficiently far into housing 1, as a result of force exerted on its endface projecting out of housing 1 so that annular channel 38 bridges the internal annular seal 37 of sleeve 30, as shown in FIG. 2, housing chamber 16 will communicate with partial chamber 17$^{IV}$ between separating piston 19 and sleeve 30. If a sufficiently large compressive force 47 is now exerted upon piston rod 7, piston 5 will drive the fluid located ahead of it in housing chamber 16 and will force the fluid through passageway 39 into annular channel 38 and thence into partial chamber 17$^{IV}$ of cylindrical annular space 17. Under this influence, separating piston 19, actuated by pressure, will travel toward the end of housing 1 from which the piston rod emerges. Since in this inwardly displaced position of inside cylinder 2, in the embodiment shown at the right of FIG. 1, seal 41 is lifted off valve seat 43, fluid from partial chamber 17' delimited by separating piston 18 can flow from partial chamber 17'' and bore 46 into the enlarged housing chamber 15 (whereby separating piston 18 likewise travels toward the end of the housing wherefrom the piston rod emerges, although to a lesser degree than separating piston 19, so that the pressure medium (spring 25) is more strongly compressed in pressure medium chamber 24). In the embodiment shown at the left in FIG. 1, partial chamber 17''' remains constantly connected with housing chamber 15 via bore 46.

If no compressive force, or a compressive force insufficient to overcome the outward-pushing forces acting upon piston 5, acts upon piston rod 7, piston 5 together with piston rod 7 is pushed out of housing 1, whereupon pistons 18 and 19, while increasing the distance between them, i.e., with a decrease in the tension of the pressure medium in pressure medium chamber 24, travel toward sleeve 30. The fluid flows are exactly reversed by this process, as in the previously discussed case of the pushing of the piston rod inward. If the activating force 49 is then taken up by inside cylinder 2, the latter returns to the position shown in FIG. 1 so that piston 5 and hence piston rod 7 are blocked in the new resting position shown in FIG. 2.

The gas pressure in pressure medium chamber 24 and the pretensioning of coil pressure springs 25 can be made sufficiently great that the adjustment assembly has a nearly horizontal pathforce curve, i.e., the forces required to displace piston rod 7 to the completely extended and completely withdrawn positions of the piston rod differ only slightly.

Piston rod 7 is provided at its free end with a pin 50, which has a slightly smaller diameter than piston rod 7 and is provided with an annular groove 51 in its free end. This allows attachment of the piston rod to an object, for example a table base or a backrest beneath the seat cushion of an automobile seat.

Sealing plug 8 and sleeve 30 can of course be protected additionally against sliding into housing 1 by appropriate constrictions in outside cylinders 3 and 3'.

In general, the preliminary tensioning of compression spring 25 or the pressure of the gas in pressure medium chamber 24 is selected so that the necessary outward pushing forces are produced against a force 47.

It will be obvious to those skilled in the art that various changes may be made without departing from the scope of the invention and the invention is not to be considered limited to what is shown in the drawings and described in the specification.

What is claimed:

1. A lengthwise-adjustable, pressure-medium charged, hydraulically blockable adjustment assembly comprising:

an outer cylinder;

an inner cylinder fitting coaxially within said outer cylinder and having a sealed off face at one end thereof, said sealed off face exposed to the outside;

a piston displaceably mounted within said inside cylinder, said piston separating in a sealing, fluid-tight manner, said inside chamber into first and second housing chambers;

a piston rod connected to said piston and extending sealingly outside of said cylinders at the end opposite said sealed off face;

first and second axially displaceable separating pistons disposed in the annular space between said outer and inner cylinders in a fluid-tight manner and defining a first annular chamber on the side of said first separating piston opposite said second separating piston, a second annular chamber between said first and second separating pistons and a third annular chamber on the side of said second separating piston opposite said first separating piston;

said inner cylinder having a passageway through the wall thereof in the vicinty of the sealed off end thereof;

sealing means for sealing off said passageway in one position of said inner cylinder and for permitting access to said second annular chamber when in a second position;

connecting means for permitting fluid access from said housing chamber on the side of said piston which is connected to said piston rod to at least a portion of said first annular chamber;

pressure means within said second annular chamber for urging said first and second separating pistons apart; and substantially non-compressible fluid filling said first and second housing chambers and said first and third annular chambers;

whereby said inner cylinder may be axially displaced between a locking position at which said sealing means seals off said passageway and said piston is locked and a releasing position at which said sealing means permits access of said passageway to said second annular chamber and said piston may move.

2. An adjustment assembly in accordance with claim 1, further including a guide sleeve means at the end of said outer cylinder opposite the end from which said piston rod emerges for guiding said inner cylinder.

3. An adjustment assembly in accordance with claim 2, wherein said guide sleeve means is integral with said outer cylinder.

4. An adjustment assembly in accordance with claim 2, further including a stop ring on said inner cylinder which is capable of resting against said guide sleeve means when said inner cylinder is axially displaced toward said locking position.

5. An adjustment assembly in accordance with claim 1, wherein the wall of said inner cylinder on either side of said passageway is constricted into an annular channel.

6. An adjustment assembly in accordance with claim 1, wherein said passageway is made in the form of a flow throttle.

7. An adjustment assembly in accordance with claim 1, further including means for guiding said inner cylinder at the piston rod end thereof in a substantially radially play-free manner.

8. An adjustment assembly in accordance with claim 7, further including sealing sleeve means for closing said outside cylinder around said piston rod in a fluid-tight manner, and a tubular stop on said sealing sleeve means radially guiding said inner cylinder.

9. An adjustment assembly in accordance with claim 1, further including stop means connected to said inner cylinder for preventing said inner cylinder from sliding out of said outer cylinder at the end thereof opposite that through which said piston rod extends.

10. An adjustment assembly in accordance with claim 9, wherein said outer cylinder has a valve seat provided on the inside wall thereof within said first annular chamber and wherein said stop means comprises a seal connected to said inner cylinder in the area of said first annular chamber, said seal capable of resting against said valve seat in a fluid-tight manner when said inner cylinder is axially displaced toward said locking position.

11. An adjustment assembly in accordance with claim 10, further including a radial annular flange on said inner cylinder, said seal being fitted around said flange.

12. An adjustable assembly in accordance with claim 10, wherein said seal is composed of hard rubber.

13. An adjustable assembly in accordance with claim 10, wherein the diameter of said outer cylinder on the side of said valve seat in the direction of the end of said outer cylinder from which said piston rod extends is greater than the diameter of said outer cylinder on the opposite side of said valve seat, and wherein said valve seat comprises a conical transition element in the wall of said outer cylinder between said two different diameters.

* * * * *